Oct. 7, 1941.  W. L. ZINK  2,258,433
DRAG HARROW
Filed Feb. 15, 1939
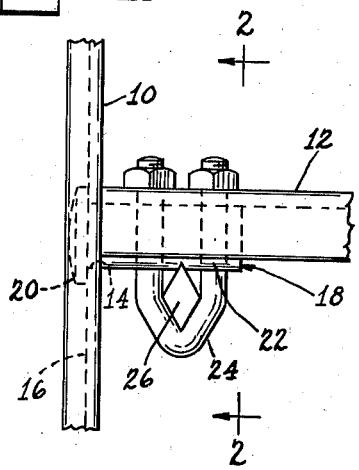
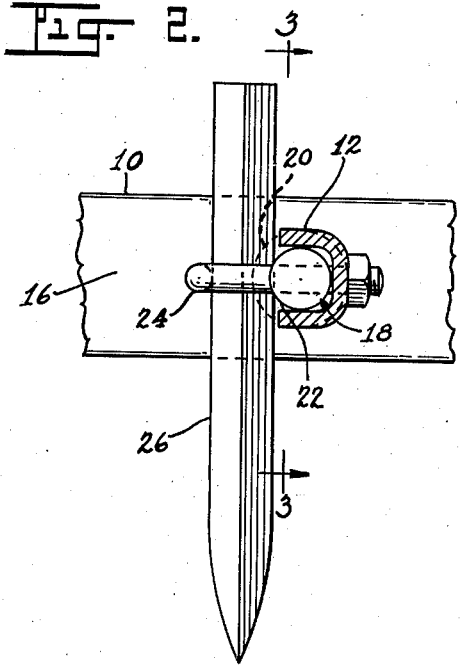
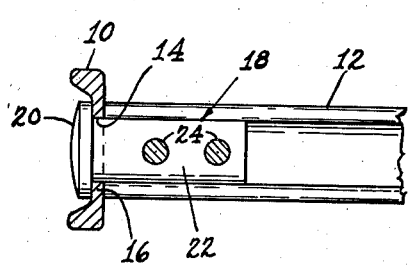
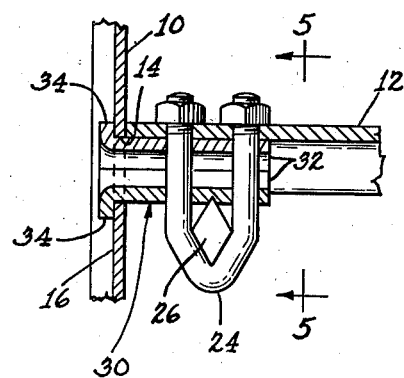
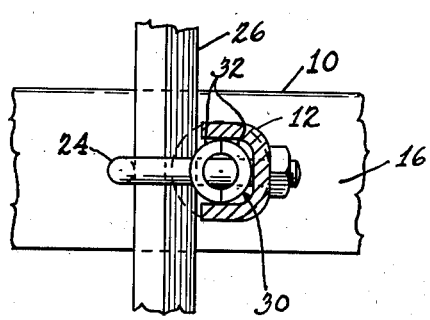
William L. Zink
INVENTOR
BY Carlton C. Davis
ATTORNEY Patented Oct. 7, 1941

2,258,433

UNITED STATES PATENT OFFICE 2,258,433

DRAG HARROW

William L. Zink, Plano, Ill., assignor to Sears, Roebuck and Co., Chicago, Ill., a corporation of New York Application February 15, 1939, Serial No. 256,417

4 Claims. (Cl. 55—8)

This invention relates generally to farm implements, and more particularly, drag harrows, and has for its principal object the provision of an improved drag harrow which is simple in construction and easily assembled.

Another important object of this invention is to provide an improved drag harrow having novel means for connecting the cross-bars to the side rails of a harrow frame.

These and other objects and advantages will be apparent from the following description, reference being had to the accompanying drawing, in which:

Figure 1 is a fragmentary top plan view of a spike tooth harrow embodying the features of this invention;

Figure 2 is a vertical sectional view taken along the line 2—2 of Figure 1 and turned clockwise 90°;

Figure 3 is a vertical sectional view taken substantially along the line 3—3 of Figure 2;

Figure 4 is a horizontal sectional view showing another embodiment of the invention; and Figure 5 is a vertical sectional view, similar to Figure 2, taken along the line 5—5 of Figure 4 and turned clockwise 90°.

Referring to the drawing, a spike tooth drag harrow to which the present invention particularly appertains, comprises a frame which includes spaced apart side rails 10 which are preferably channel-shaped in cross-section, as illustrated in Figure 3. The spike teeth for working the ground are carried by bars 12 which are rotatably connected to the side rails 10 in order that the teeth may be positioned either vertically or nearly horizontal to the ground. Various means have heretofore been provided for connecting the bars on which the teeth are mounted to the side rails, and it is an improved structure for rotatably connecting the bars 12 to the side rails 10 to which the present invention is directed.

The cross-bars 12 on which the spike teeth of the drag harrow are mounted is preferably U-shaped in cross-section, as best shown in Figure 2. The side rail 10 is provided with an opening 14 in the web portion 16 thereof for receiving a shaft element or journal 18 which extends through the opening 14 and is provided with a head portion 20 in engagement with the outer surface of the web 16.

The shank portion 22 of the journal 18 extends through the opening 14 and is receivable in the end portion of the U-shaped cross-bar 12. The journal 18 is connected to the cross-bar 12 by means of a U-bolt 24 which extends through a pair of openings in the shank portion 22 of the journal and the end portion of the cross-bar 12. The U-bolt 24 performs a double function in that it not only serves to connect the journal 18 to the cross-bar 12 but also fastens a spike tooth 26 to the cross-bar 12. It will be noted that the spike tooth is preferably diamond shaped in cross-section and positioned with an edge in engagement with the journal. The journal is provided with a groove for receiving the edge of the tooth in engagement therewith in order that the tooth may be retained in the position desired, and the U-bolt 24 is also V-shaped in general formation at the base portion thereof for conforming to the outer contour of the tooth.

The end of the cross-bar 12 abuts the inner surface of the side rail 10, which, together with the head portion 20 of the journal 18, prevents any thrust of the bar 12 in either direction with respect to the side rail 10. It will be noted that the journal 18 illustrated in Figures 1, 2, and 3 is a solid piece, which particularly adapts it to be made as a casting.

Another form of the invention is illustrated in Figures 4 and 5 in which the parts hereinbefore described have been given the same reference characters. In this form of the invention, however, a split tubular ferrule or journal 30 is provided which comprises a pair of semi-tubular portions 32. Each of the split ferrule portions 32 is formed for providing an outwardly turned flange portion 34.

The flange portions 34 of the pair of split ferrule portions 32 combine to provide a head portion for the split ferrule 30 which is the equivalent of the head portion 20 heretofore described in connection with the journal 18. One of the split ferrule portions 32 is provided with a groove for receiving the harrow tooth 26 in order that the harrow tooth may be as definitely retained in position when used in connection with the split ferrule 30 as when used in combination with the journal 18.

It will be noted from Figures 4 and 5 that the tooth 26 is not only connected to the cross-bar 12 by the U-bolt 24, but also co-acts with the U-bolt and the cross-bar for holding the split ferrule portions 32 together, thereby providing the tubular ferrule 30.

An important advantage of the split tubular ferrule construction is that the ferrule portions may be quickly and easily stamped or formed from sheet metal, which provides for an increased rate of production.

Various modifications may suggest themselves to those skilled in the art without departing from the spirit of my invention and, hence, I do not wish to be restricted to the specific form shown or uses mentioned, except to the extent indicated in the appended claims, which are to be interpreted as broadly as the state of the art will permit.

I claim:

1. A harrow of the character described comprising a frame bar having an opening therethrough, a tool bar positioned transversely to the frame bar and in abutting relationship therewith, a tubular journal extending through the opening in the frame bar for rotatably connecting the tool bar to the frame bar, said tubular journal comprising a pair of semitubular journal portions disposed in complementary relationship on a common side of said tool bar and provided with outwardly formed integral flange portions for engagement with the outer side of the frame bar, said journal portions and tool bar being provided with a pair of spaced aligned openings therethrough, a tooth member positioned on the outer side of the tubular journal between the paired openings, and a U-bolt extending over the tooth member and through the paired openings for connecting and retaining the frame bar, the tool bar, the semitubular journal portions, and the tooth member in an assembled unit.

2. A harrow of the character described comprising a frame bar having an opening, a tool bar transverse to and abutting said frame bar, a journal extending through said opening and rotatably connecting said tool bar to said frame bar, said journal comprising a pair of journal portions disposed in complementary relation on a common side of said tool bar and provided with outwardly formed integral flange portions engaging the outer side of said frame bar, said journal portions and tool bar having alined openings, a tooth member positioned on the outer side of said journal, and connecting means extending over said tooth member and through said alined openings for connecting and retaining said frame bar, said tool bar, said journal portions and said tooth member in an assembled unit.

3. A harrow of the character described comprising a frame bar having an opening, a tool bar transverse to and abutting said frame bar, a journal extending through said opening and rotatably connecting said tool bar to said frame bar, said journal comprising a pair of journal portions disposed in complementary relation on a common side of said tool bar and provided with outwardly formed integral flange portions engaging the outer side of said frame bar, said journal portions and tool bar having a pair of spaced alined openings, a tooth member positioned on the outer side of said journal between the paired openings, and a U-bolt connecting means extending over said tooth member and through said paired openings for connecting and retaining said frame bar, said tool bar, said journal portions and said tooth member in an assembled unit.

4. A harrow of the character described comprising a frame bar having an opening, a tool bar transverse to and abutting said frame bar, a journal extending through said opening and rotatably connecting said tool bar to said frame bar, said journal comprising a pair of journal portions disposed in complementary relation on a common side of said tool bar and provided with outwardly formed integral flange portions engaging the outer side of said frame bar, said journal portions and tool bar having a pair of spaced alined openings, a tooth member positioned on the outer side of said journal between the paired openings, and a U-bolt connecting means extending over said tooth member and through said paired openings for connecting and retaining said frame bar, said tool bar, said journal portions and said tooth member in an assembled unit, said tooth member having an angular cross-section, said U-bolt having a V-shaped bight receiving a correspondingly shaped portion of said tooth, said journal having a notch receiving another portion of said tooth member.

WILLIAM L. ZINK.